Patented June 26, 1945

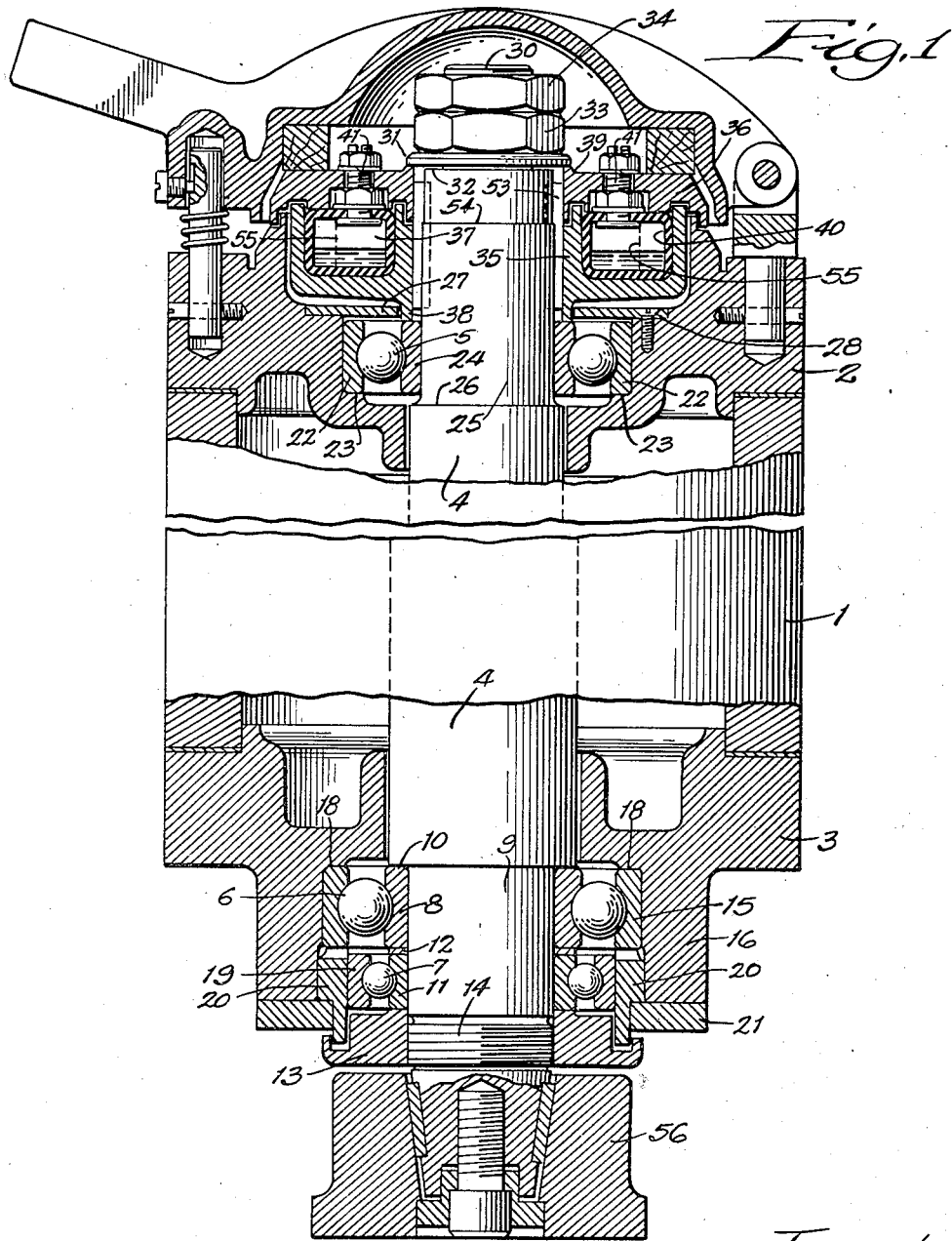

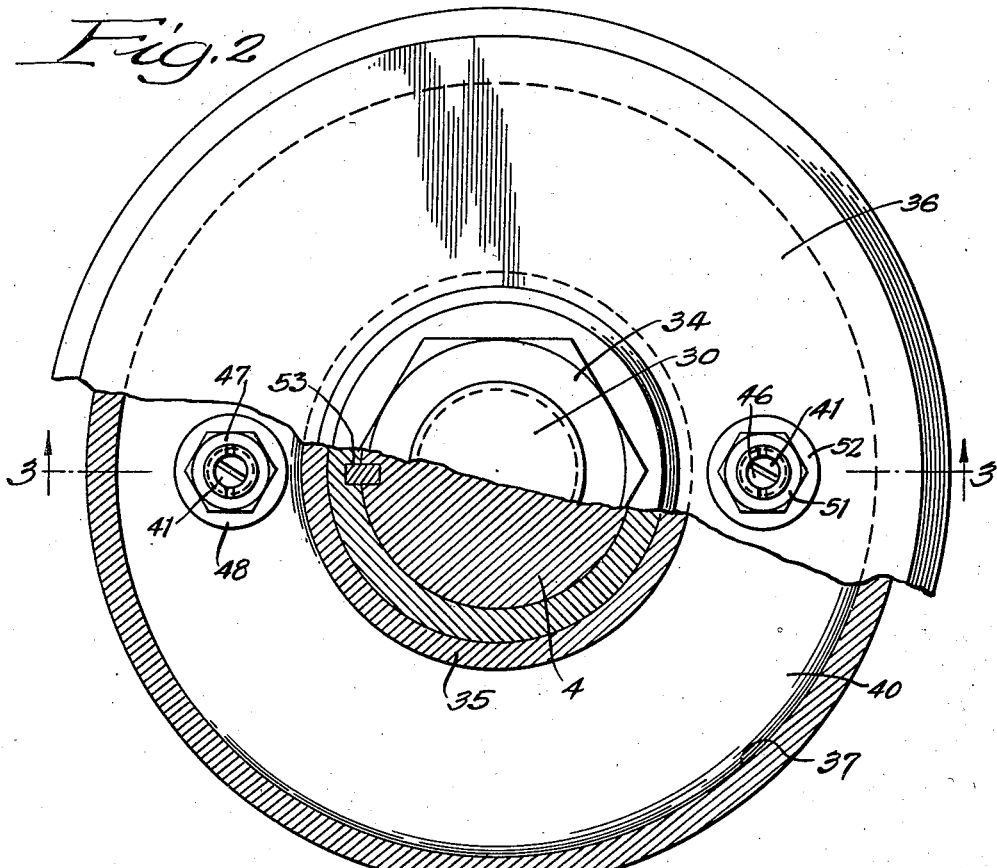
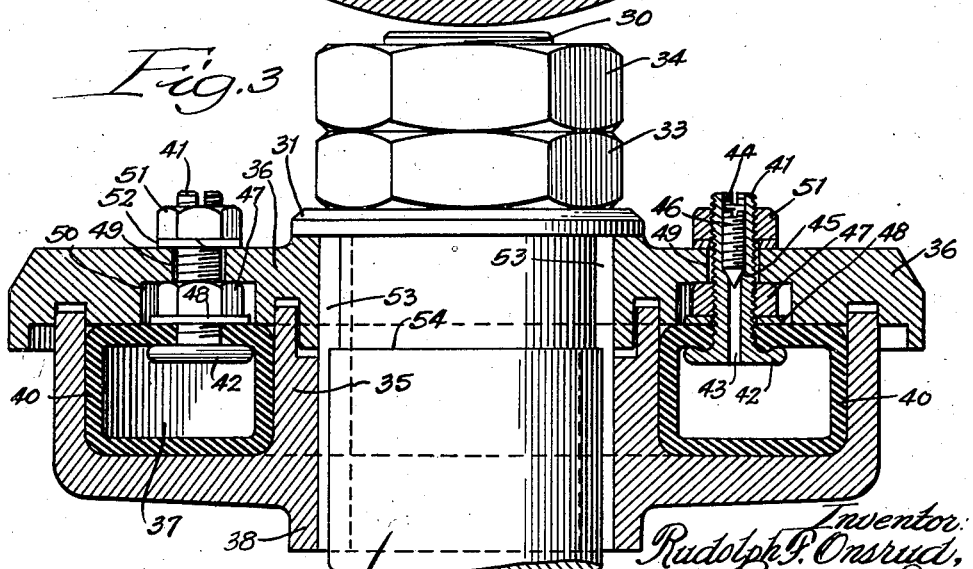

2,379,099

UNITED STATES PATENT OFFICE 2,379,099

CENTRIFUGAL THRUST LOADER

Rudolph F. Onsrud, Chicago, Ill., assignor to Onsrud Machine Works, Inc., Chicago, Ill., a corporation of Illinois Application August 30, 1943, Serial No. 500,525

19 Claims. (Cl. 308—189)

This invention relates to high speed rotary appliances and particularly to means for automatically eliminating end play in high speed spindles carried by ball bearings.

It is well known that thrust bearings are adaptable only for slow speed spindles and generate heat at high speeds. The requirement for taking up play, which always exists in the running fit of a ball bearing, becomes an acute problem especially in connection with high speed vertical spindles designed for accurate face milling. A fly cutter mounted on the lower end of a vertical shaft will ordinarily hang at its lowermost position due to gravitation; then when encountering the resistance of the work, it will rise from a few ten-thousandths to several thousandths of an inch, producing annular markings on the face of the work. Even closely fitted so-called "preloaded" bearings will compress slightly up to a thousandth of an inch or possibly more when subjected to end thrust load, say in the neighborhood of 200 to 300 pounds.

The present invention provides a solution for this problem wherein a simple form of device for applying centrifugal force developed by the rotating spindle is utilized. When the spindle is rotating at its normal working speed, this invention provides a thrust on one member of a pair of ball bearings in the opposite direction to the thrust on the other member of the pair so as to prevent effectively any end play that might cause deviation in the axial alinement of the spindle and thereby prevents markings on the work due to axial shifting of the spindle.

The main objects of this invention are to provide improved means for preserving true axial positioning and alinement of high speed rotating spindles, particularly such as carry rotary cutters in milling operations; to provide improved means whereby variable end thrust on a high speed spindle mounted in the ball bearings is effectively prevented from disturbing the true alinement of the spindle during milling operations; to provide a mechanism of this kind wherein centrifugal force produced by the running speed of a vertical spindle is utilized to subject a pair of ball bearings carrying the spindle to an end thrust on one of said bearings in compensating relation to the end thrust produced by the weight of the spindle and parts carried thereby, and thereby establish and preserve true axial alinement of the spindle at its normal running speed; and to provide a centrifugal device of this kind that can be readily calibrated to control the thrust compensating factor for optimum requirements.

A specific embodiment of this invention is illustrated in the accompanying drawings in which:

Figure 1 is a side elevation partly in section, and partly broken away, of a metal bevel milling machine provided with thrust compensating mechanism constructed according to this invention.

Fig. 2 is a top plan partly in section of the axially expansible hollow cell structure which holds the liquid which under centrifugal force produces end thrust on the vertically disposed rotating spindle of the device shown in Fig. 1.

Fig. 3 is a vertical section of the same, taken on the line 3—3 of Fig. 2.

In the form shown, the milling machine comprises an electric motor, represented in Figure 1 by the cylindrical body 1 and its end caps 2 and 3, in which the vertical spindle 4 is carried by the ball bearings 5, 6 and 7.

The inner race ring 8 of the bearing 6 has a snug fit on the reduced portion 9 of the spindle 4 and is held in contact with the shoulder 10 by means of the inner race ring 11 of the bearing 7, an interposed washer 12 and a nut 13 on a threaded portion 14 of the spindle. The outer race ring 15 fits snugly within a counterbore in the hub 16 of the lower frame cap 3 of the motor and the upper rim of the race ring 15 bears on an abutment or shoulder 18 on the frame. The bearing 7 has smaller balls than the bearing 6 and its outer race 19 fits snugly within a ring 20, interposed between it and the bore in the hub 16 and secured by a retaining ring 21. The nut 13 bears only on the race ring 11 and has substantial clearance from contact with ring 20.

The outer race ring 22 of the upper bearing 5 fits snugly within a portion of the bore of the frame cap 2 of the motor and rests on an abutment shoulder 23 formed in said bore. The inner race ring 24 of the bearing 5 fits snugly on the reduced portion 25 of the spindle 4 but is spaced above the shoulder 26 of the spindle so as to have some freedom of axial movement on the spindle. A ring-spaded plate 27 resting on a shoulder 28 of the frame cap 2 overlies the bearing 5.

The spindle 4 extends above the bearing 5 and its upper end is reduced in diameter and threaded to form a stud 30 on which is mounted an abutment collar or washer 31 which is firmly clamped against a shoulder 32 on the spindle 4 by means of a nut 33 and lock-nut 34.

Interposed between the abutment collar 31 and the top of the inner race ring 24 of the bearing 5 is an axially extensible annular cell or housing comprising a hollow body member or cylinder 35 and a head 36 which have telescoping engagement with each other so as to form an annular liquid chamber 37 that may be expanded in an axial direction through the relative telescoping movement of the body 35 and head 36. The body 35 has a depending hub portion 38 which extends through a central aperture in the plate 27 and rests on the upper rim of the inner race ring 24 of the bearing 5 and the head 36 has a corresponding upstanding hub or boss 39 which bears against the abutment collar 31 on the spindle. Housed within and lining the annular cavity 37 in the body 35 is a liquid-tight endless annular tube 40 of elastic material, such as rubber or the like. The tube 40 is partly filled with water, or other appropriate liquid, (as illustrated in Fig. 1) and is fitted with a filler nipple 41. Preferably there are two such nipples (as illustrated in Figs. 2 and 3), so that the rotating parts may be kept in balance.

The nipple 41 is externally threaded throughout the length of its shank portion and has a head 42 at its lower end shaped for sealing engagement with the tube 40. The nipple has a small axial bore 43 in its lower part and a somewhat larger internally threaded counterbore 44 in its upper portion leading to a conical seat 45 at its juncture with the bore 43. A headless screw 46 fits the counterbore 44 and has a conical tip that fits the seat 45. The nipple 41 is clamped to the tube 40 by means of a nut 47 and washer 48 and the head 36 is appropriately bored at 49 to receive the nipple 41, and counterbored at 50 to receive the nut 47 which coacts with a second nut 51 and washer 52 to lock the nipples in place with respect to the head 36.

The body 35 and the head 36 of the expansible cell are connected to the spindle 4 by splines 53 so as to rotate therewith without interference with their relative sliding movement. As shown in Fig. 2, the body 35 fits slidably on an adjacent portion of the shaft 4. Similarly, the head 36 fits on a reduced portion of the shaft 4. A shoulder 54 on the spindle 4 cooperates with the abutment ring 31 to clamp the head 36 in a fixed position on the spindle. In Figs. 1 and 3, the plane of section of parts 35 and 36, as illustrated, happens to come where the walls of these parts are reduced in thickness by the keyways which receive the keys 53, the keys and adjacent portions of the shaft being shown in elevation.

The operation of the device shown is as follows:

A predetermined quantity of liquid, having been placed in the cell 37, will be thrown toward the outer periphery of the annular cell 37 whenever the spindle 4 is rotated rapidly by its driving motor and all of the liquid will be crowded toward the outer peripheral wall of the cell so that its free surface will be vertical, as indicated by the broken lines 55 in Fig. 1.

Centrifugal force crowding the liquid radially outward will cause it to exert an upward pressure toward the head 36 and a downward pressure toward the bottom of the body member 35 so as to force these apart. The amount of this vertical force will, of course, be proportionate both to the centrifugal force acting upon the liquid and the horizontal area of the wall of liquid standing between the top and bottom of the tube 40. The radial thickness of this ring-like wall of liquid depends on the quantity of liquid present. This horizontal area can be changed by admitting or removing liquid from the cell in a calibrating operation as will be understood.

In a milling machine of the kind shown, rotating at 3600 revolutions per minute, this centrifugal thrust loader, when charged with 3 to 5 ounces of water, will produce an upward thrust of sufficient amount to lift 200 to 500 pounds on the spindle of the machine. By regulating the amount of liquid in the chamber, the amount of upward thrust on the spindle can be regulated and calibrated to the optimum requirements of the particular machine.

In a milling machine of the kind illustrated in the drawings, the weight of the spindle and parts carried thereby exerts a downward pull or thrust upon the ball bearings when the machine is at rest. This produces a measurable displacement of the inner race rings from true alinement with the outer race. An equal upward thrust would correspondingly displace the spindle upward. When the spindle is spinning at high speed in engagement with the work, it can thus drift between such limits of rise and fall and cause imperfections in the finish of the surface worked upon by the cutter 56.

With the present invention this condition is obviated because, as the spindle is rotated up to its normal running speed before the cutter is brought into contact with the work, the liquid in the cell 37 causes the head 36 to exert an upward thrust on the spindle 4, creating an upward thrust on the inner ring 18 of the bearing 6 and at the same time forcing the body member 35 of the cell downwardly against the inner ring 24 of the bearing. This thrust is preferably greater than the thrust produced by the weight of the spindle and its connected parts and is sufficient to offset not only the pull of gravity but also the forces encountered by the cutter, so as to fix the position of the spindle and the cutter 56 against any disturbance of its normal cutting action.

Although but one specific embodiment of the invention is herein shown and described, it will be understood that numerous details may be altered or omitted without departing from the spirit of the invention as defined by the following claims.

I claim:

1. A device of the class described, comprising a pair of axially alined ball bearings, each comprising a stator race, a rotor race and interposed balls, one of said rotor races being axially slidable; centrifugal means mounted to rotate with said rotor races; and thrust means actuated by said centrifugal means to urge said rotor races axially in opposite directions.

2. A device of the class described, comprising a spindle; a pair of axially spaced ball bearings carrying said spindle, each said bearing comprising an inner race, an outer race and interposed balls, the inner race of one bearing being axially fixed on said spindle, the inner race of the other bearing being axially slidable on said spindle; and centrifugal means on said spindle acting between said slidable inner race and said spindle to produce oppositely directed axial thrusts on said inner races respectively.

3. A device of the class described, comprising a spindle; a pair of axially spaced ball bearings carrying said spindle, each said bearing comprising an inner race, an outer race and interposed balls, the inner race of one bearing being axially fixed on said spindle, the inner race of the other bearing being axially slidable on said spindle; an axially expansible hollow annular cell mounted on said spindle for rotation therewith; a liquid in said cell actuated by centrifugal force to expand said cell; and abutment means between which said cell acts to subject said inner ball races respectively to oppositely directed axial thrusts through the expansion of said cell.

4. A device of the class described, comprising a vertical spindle; a pair of axially spaced ball bearings carrying said spindle, each bearing having inner and outer races with interposed balls whereby the normal load on said spindle will produce a downward thrust on the inner race of one of said bearings, one of said inner races being axially slidable; and centrifugal means acting between said one bearing and said spindle to lift said spindle and thus produce an upward thrust on the inner race of the other of said bearings through the rotation of said spindle.

5. A device of the class described, comprising a vertical spindle; a pair of axially spaced ball bearings carrying said spindle, each bearing having inner and outer races with interposed balls whereby the normal load on said spindle will produce a downward thrust on the inner race of one of said bearings, one of said inner races being axially slidable; and centrifugal means mounted on and rotatable with said spindle and acting between said one bearing and said spindle to lift said spindle and thus produce an upward thrust on the inner race of the other of said bearings through the rotation of said spindle.

6. A device of the class described, comprising a rotary spindle, a bearing therefor, having relatively inclined races with interposed antifriction element, one of said races being axially shiftable relatively to its mate, an axially expansible hollow cylindrical cell mounted on said spindle for rotation therewith, a liquid in said cell actuated by centrifugal force to exert an expanding pressure in said cell, and abutment means coacting with said cell to shift said shiftable race axially to tighten said bearing.

7. A device of the class described, comprising a spindle, axially spaced ball bearings for said spindle, one of said bearings having a ball race axially slidable on said spindle, an axially expansible hollow cylindrical cell on said spindle and rotatable therewith, a liquid within said cell actuated by centrifugal force to expand the cell, and abutment means at respectively opposite ends of said cell to move said slidable race to tighten said bearings.

8. A device of the class described, comprising a shaft; a pair of axially spaced ball bearings carrying said shaft, each said bearing comprising an inner race, an outer race and interposed balls, one of said inner races being axially slidable on said shaft; a pair of annular housing members concentrically mounted on said shaft and shaped to define an annular cell space between them, one of said housing members being axially shiftable relatively to the other for contracting and expanding said cell space; a liquid confined in said cell space and actuated by centrifugal force to urge said housing members apart; and abutment means respectively related to said housing members whereby the axial expansion of said cell space will exert oppositely directed axial thrusts on said inner ball races respectively.

9. A device of the class described, comprising a shaft; a pair of axially spaced ball bearings carrying said shaft, each said bearing comprising an inner race, an outer race and interposed balls; a pair of annular housing members concentrically mounted on said shaft and shaped to define an annular cell space between them, one of said housing members being axially shiftable relatively to the other for contracting and expanding said cell space; a liquid confined in said cell space and actuated by centrifugal force to urge said housing members apart; one of said inner ball races and one of said housing members being axially fixed relative to said shaft and the other of said inner ball races being axially shiftable on said shaft; and abutment means relating said shiftable housing member to said shiftable inner bearing race, whereby the axial expansion of said cell will exert oppositely directed axial thrusts on said inner ball races respectively.

10. A device of the class described, comprising a shaft; a pair of axially spaced ball bearings carrying said shaft, each said bearing comprising an inner race, an outer race and interposed balls, one of said inner races being axially slidable; a pair of annular housing members concentrically mounted on said shaft and shaped to define an annular cell space between them, one of said housing members being axially shiftable relatively to the other for contracting and expanding said cell space; a liquid-tight endless annular elastic tube lining said cell; a liquid confined in said elastic tube and actuated by centrifugal force to urge said housing members apart; and abutment means respectively related to said housing members whereby the axial expansion of said cell space will exert oppositely directed axial thrusts on said inner ball races respectively.

11. A device of the class described, comprising a pair of axially alined bearings, each comprising a stator race, a rotor race and interposed antifriction elements, one of said rotor races being axially slidable; centrifugal means mounted to rotate with said rotor races; and thrust means actuated by said centrifugal means to urge said rotor races axially in opposite directions.

12. A device of the class described, comprising a spindle; a pair of axially spaced bearings carrying said spindle, each said bearing comprising an inner race, an outer race and interposed antifriction elements, the inner race of one bearing being axially fixed on said spindle, the inner race of the other bearing being axially slidable on said spindle; an axially expansible hollow annular cell mounted on said spindle for rotation therewith; means in said cell actuated by centrifugal force to expand said cell; and abutment means between which said cell acts to subject said inner races respectively to oppositely directed axial thrusts through the expansion of said cell.

13. A device of the class described, comprising a rotary spindle, a bearing therefor, an axially expansible hollow cylindrical cell mounted on said spindle for rotation therewith, a centrifugally movable element in said cell actuated by centrifugal force to exert an expanding pressure in said cell, and abutment means coacting with said cell to shift said spindle axially in said bearing.

14. A device of the class described, comprising a rotary member, a bearing therefor, an axially expansible hollow annular cell driven by said rotary member, a liquid in said cell actuated by centrifugal force to exert pressure to expand said cell, and abutment means positioned to load said bearing through expansion of said cell.

15. A device of the class described comprising a rotary spindle, a bearing therefor having an axially shiftable race, thrust means for axially shifting the race with respect to the spindle, and centrifugal means carried by said spindle for actuating said thrust means in response to rotation of the spindle to reduce the running fit of the bearing in response to an increase in spindle speed.

16. A device of the class described comprising a rotary spindle, an anti-friction bearing therefor having an axially shiftable race, and centrifugally actuated means crried by said spindle and acting between said bearing and spindle to shift said race to reduce the running fit of the bearing in response to an increase in spindle speed.

17. A device of the class described comprising a rotary spindle, an anti-friction bearing therefor having an axially shiftable race, and centrifugal means carried by said spindle end comprising a cell, a liquid contained therein, and means actuated by the pressure of said liquid and acting between said shiftable bearing race and the spindle to axially shift the race to reduce the running fit of the bearing in response to an increase in spindle speed.

18. A device of the class described comprising a rotary spindle, an anti-friction bearing for said spindle having an axially shiftable race, centrifugal means carried by said spindle, abutment means adjacent to said centrifugal means, and axial thrust means actuated by said centrifugal means to create an axial thrust between said abutment means and said axially shiftable race to apply a radial load to the bearing.

19. A device of the class described comprising a rotary member, a bearing therefor including a part axially movable thereon, centrifugal means driven by said rotary member, abutment means adjacent to said centrifugal means, and axial thrust means actuated by said centrifugal means to create an axial thrust between said abutment means and said axially movable part to apply a radial load to the bearing.

RUDOLPH F. ONSRUD.